(12) United States Patent
Enright

(10) Patent No.: US 6,631,526 B1
(45) Date of Patent: Oct. 14, 2003

(54) VEHICLE SLEEPER SYSTEM WITH IMPROVED SUSPENSION CONTROL

(76) Inventor: Russell V. Enright, 11340 W. 38th Ave., #36, Wheat Ridge, CO (US) 80033

( * ) Notice: Subject to any disclaimer, the term of this patent is extended or adjusted under 35 U.S.C. 154(b) by 57 days.

(21) Appl. No.: 09/724,141

(22) Filed: Nov. 27, 2000

Related U.S. Application Data (63) Continuation-in-part of application No. 08/766,760, filed on Dec. 13, 1996, now abandoned.

(51) Int. Cl.[7] ............................................. A47C 17/80
(52) U.S. Cl. ................................................ 5/118; 5/253
(58) Field of Search ............................ 5/118, 136, 104, 5/253; 114/192; 296/190.02, 156

(56) References Cited

U.S. PATENT DOCUMENTS

| | | | |
|---|---|---|---|
| 567,708 A | * | 9/1896 | Goodwin .................... 114/192 |
| 3,524,673 A | * | 8/1970 | Crammer .................... 296/156 |
| 4,107,797 A | | 8/1978 | Maxwell, Sr. |
| 4,144,601 A | | 3/1979 | Anderson et al. |
| 4,196,483 A | | 4/1980 | Lefler et al. |
| 4,669,139 A | | 6/1987 | Richter et al. |
| 4,868,939 A | | 9/1989 | Tagtow |
| 5,218,728 A | | 6/1993 | Lloyd |
| 5,638,560 A | * | 6/1997 | Rigdon et al. ......... 296/190.02 |

* cited by examiner

*Primary Examiner*—Heather Shackelford
*Assistant Examiner*—Fredrick Conley
(74) *Attorney, Agent, or Firm*—John L. Isaac (57) ABSTRACT

A bed assembly is disclosed for use within a moving vehicle which vehicle includes a base support floor and a plurality of side wall members. The bed assembly includes a frame adapted to support a mattress and which has a generally rectangular perimeter. A plurality of attachment members are secured to the vehicle and are spaced about the perimeter of the frame. A plurality of tension elements interconnect the frame and the attachment members. Finally, a plurality of adjustable shock absorbing and dampening devices interconnect the frame and the vehicle base support floor to provide vertical support to the frame. The shock absorbing and dampening devices are aligned angularly relative to the frame to cooperate with the tension elements to dampen the fore-and-aft, lateral and vertical motion of the frame relative to the vehicle base support floor and side wall members during movement of the vehicle.

25 Claims, 7 Drawing Sheets

VEHICLE SLEEPER SYSTEM WITH IMPROVED SUSPENSION CONTROL

RELATED APPLICATION

This is a continuation-in-part of my U.S. patent application Ser. No. 08/766,760, filed Dec. 13, 1996 now abandoned, the contents of which are specifically incorporated herein by reference.

BACKGROUND OF THE INVENTION

1. Field of the Invention

The present invention relates generally to beds and sleeper systems for moving vehicles and, more particularly, to bed assemblies for use in sleeper cabs in over-the-road trucks. Specifically, the present invention relates to improved mounting and suspension control assemblies for such moving vehicle sleeper systems.

2. Description of the Prior Art

Sleeper cabs for trucks are well-known in the art. This is due to the fact that over-the-road truckers often drive in teams where one person drives while the other rests. As a result, modern trucks and other such moving vehicles frequently include a sleeping compartment positioned behind the driver and passenger seats. This sleeping compartment is typically equipped with a bed for accommodating a recumbent individual. Likewise, recreational vehicles, motor homes and even large automobiles often include one or more beds or bed-like structures. With such motor vehicles, and in particular semi-tractors which tend to have a stiff suspension system, the shocks and vibrations caused by the vehicle hitting irregularities in the pavement surface, negotiating turns, accelerating and decelerating can be transferred to the individual trying to sleep and thus disturb his or her sleep. When it is considered that serious highway accidents have been attributable to drivers who were not well rested, it is important that they be allowed to sleep soundly while another driver operates the vehicle so that transport time will not be unduly increased.

As a result of the above problem, there are numerous types of bed assemblies and suspension systems therefor devised for vehicle-mounted beds. While they are all designed to try and provide a comfortable ride for the occupant of the bed when the vehicle is in motion, they are not all successful in accomplishing this task. Unfortunately, many of these devices tend to be unduly complex and do not lend themselves to be efficiently and effectively installed and used within the confines of a sleeper cab compartment or other vehicle. Examples of such devices are seen in U.S. Pat. Nos. 4,144,601, 4,669,139, 4,196,483 and 4,977,248. These prior designs are also limited to the extent that they are primarily for controlling vertical movement and shock of the bed while ignoring lateral and fore-and-aft movement of the bed. U.S. Pat. Nos. 5,218,728 and 4,860,939 appear to offer additional shock absorption capability. However, these devices are also unduly complex and would be relatively costly to manufacture and install in the vehicle as either original or retrofit equipment. U.S. Pat. No. 4,977,631 illustrates a device which involves the direct suspension of a bed frame. However, this device would really not lend itself for adaptation and use in a moving vehicle.

As a result of the above, is clear that while sleeper cab designs have been around for quite sometime, there remains a need for a bed assembly arrangement for sleeper cabs or other moving vehicles which is adapted to significantly limit response to a wide variety of multidirectional shock and vibration movement while the vehicle is moving.

SUMMARY OF THE INVENTION

Accordingly, it is one object of the present invention to provide an improved bed assembly for use within a moving vehicle.

It is another object of the present invention to provide such a bed assembly which enhances the dampening effects against fore-and-aft, lateral and vertical motion of the bed assembly in response to movement of the vehicle.

Yet another object of the present invention is to provide a suspension system attachable to a sleeper cab of a truck for reducing the fore-and-aft, lateral and vertical motion of a bed frame mounted in the sleeper cab and secured to the suspension system.

Still another object of the present invention is to provide an improved sleeper cab for an over-the-road truck.

To achieve the foregoing and other objects and in accordance with the purpose of the present invention, as embodied and broadly described herein, a bed assembly is disclosed for use within a moving vehicle which vehicle includes a base support floor and a plurality of side wall members. The bed assembly includes a frame adapted to support a mattress and which has a generally rectangular perimeter. A plurality of attachment members are secured to the vehicle and are spaced about the perimeter of the frame. A plurality of tension elements interconnect the frame and the attachment members. Finally, a plurality of adjustable shock absorbing and dampening devices interconnect the frame and the vehicle base support floor to provide vertical support to the frame. The shock absorbing and dampening devices are aligned angularly relative to the frame to cooperate with the tension elements to dampen the fore-and-aft, lateral and vertical motion of the frame relative to the vehicle base support floor and side wall members during movement of the vehicle.

In another aspect of the invention, a suspension system is attachable to a vehicle sleeper cab for reducing the fore-and-aft, lateral and vertical movement of a bed frame mounted therein resulting from movement of the vehicle. The sleeper cab includes a floor for supporting the bed frame and a plurality of substantially vertical side walls substantially surrounding the bed frame. The suspension system includes attachment members secured to the side walls of the sleeper cab and spaced about the perimeter of the bed frame. A plurality of spring elements secure these attachment members to the frame along its perimeter. Finally, a plurality of fluid adjustable dampening devices vertically support the frame above the sleeper cab floor. The dampening devices are aligned angularly relative to the frame to cooperate with the spring elements to dampen the fore-and-aft, lateral and vertical motion of the frame relative to the sleeper cab floor and side walls during movement of the vehicle sleeper cab.

Still another aspect of the invention includes an improved truck sleeper cab. A cab housing is provided having a front portion and a rear portion. The front portion includes a driver seat, a passenger seat and truck operating controls. The rear portion includes a base floor, a rear wall, a pair of side walls, a front wall and an access opening through the front wall to permit movement between the front and rear cab portions. A bed frame is provided and has a generally rectangular perimeter disposed in the rear cab portion and is adapted to support a mattress. The bed frame is spaced above the base floor. Attachment members are secured to the rear wall, side walls and front wall of the rear cab portion and are spaced about the perimeter of the bed frame. A plurality of tension elements interconnect the bed frame and the attachment members. A plurality of adjustable shock absorbing and dampening devices interconnect the bed frame to the base floor to provide vertical support to the bed frame. Finally, the shock absorbing and dampening devices are aligned angularly relative to the bed frame to cooperate with the tension elements to dampen the fore-and-aft, lateral and vertical motion of the bed frame relative to the rear portion base floor, rear wall, side walls and front wall during movement of the truck sleeper cab.

BRIEF DESCRIPTION OF THE DRAWINGS

The accompanying drawings which are incorporated in and form a part of the specification illustrate preferred embodiments of the present invention and, together with a description, serve to explain the principles of the invention. In the drawings.

DETAILED DESCRIPTION OF THE PREFERRED EMBODIMENTS

Figure 1:
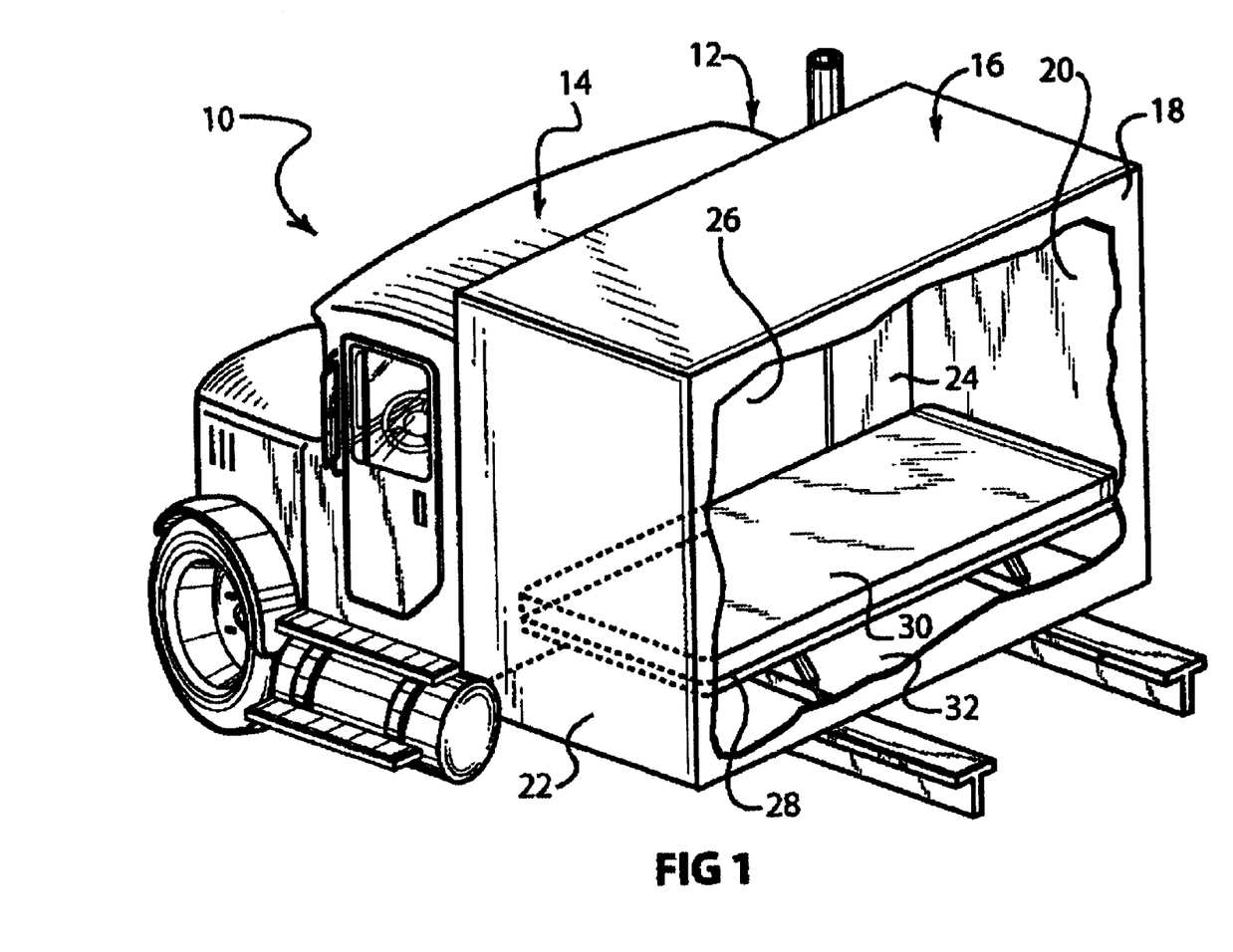
FIG. 1 is a rear perspective view, with parts broken away, of a truck sleeper cab incorporating the present invention.

Referring first to FIG. 1, a vehicle 10 in the form of a truck is illustrated. It should be understood, however, that the present invention is adaptable to any type of moving vehicle large enough to carry a bed assembly. The truck 10 includes a sleeper cab 12 which generally includes a front portion 14 and a rear portion 16. The front portion 14 typically includes the driver and passenger seats and operating controls, as discussed below, while the rear portion 16 includes the sleeping accommodations. More specifically, the rear sleeper portion 16 typically includes a compartment having a rear wall 18, a pair of side walls 20, 22 and a front wall 24 having an opening 26 therein which provides access between the front portion 14 in the rear portion 16. Disposed within the rear portion 16 is a bed frame 28 which is adapted to support a mattress 30 and is generally secured to a floor surface 32.

Figure 2:
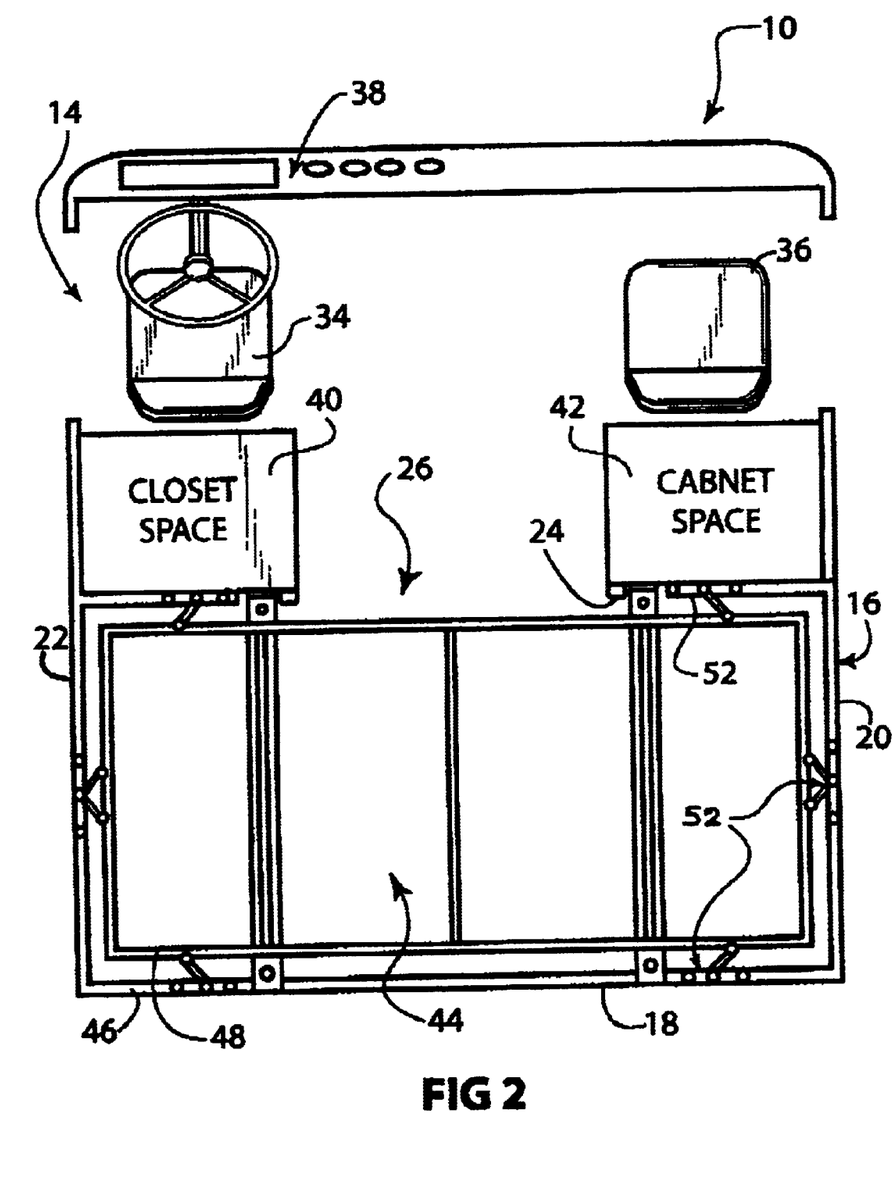
FIG. 2 is a top plan view of the interior of a truck sleeper cab adapted in accordance with the present invention.
Figure 3:
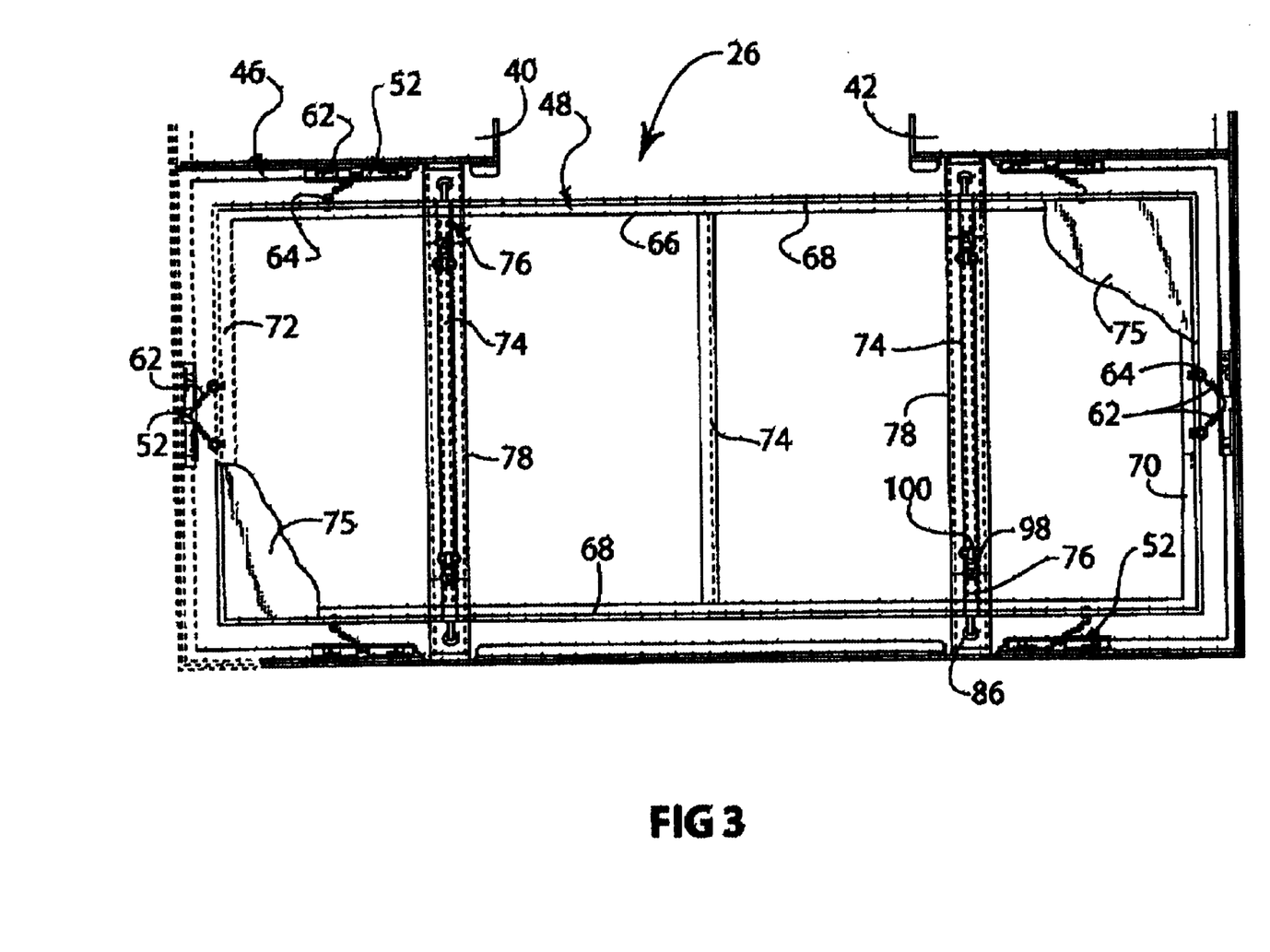
FIG. 3 is an enlarged, top plan view, with parts in section, of a bed assembly constructed in accordance with the present invention.
Figure 4:
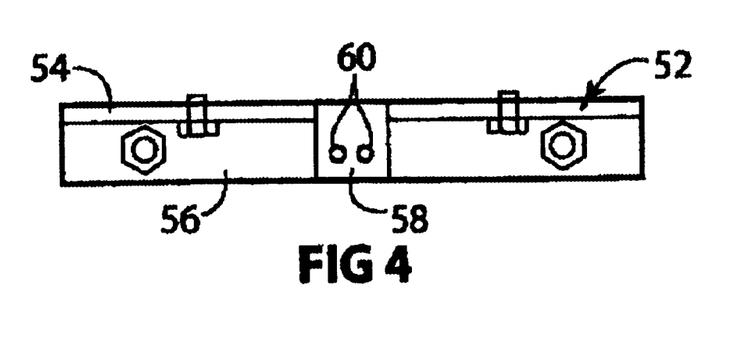
FIG. 4 is a top plan view of a tension element mounting bracket utilized in one embodiment of the present invention.
Figure 5:
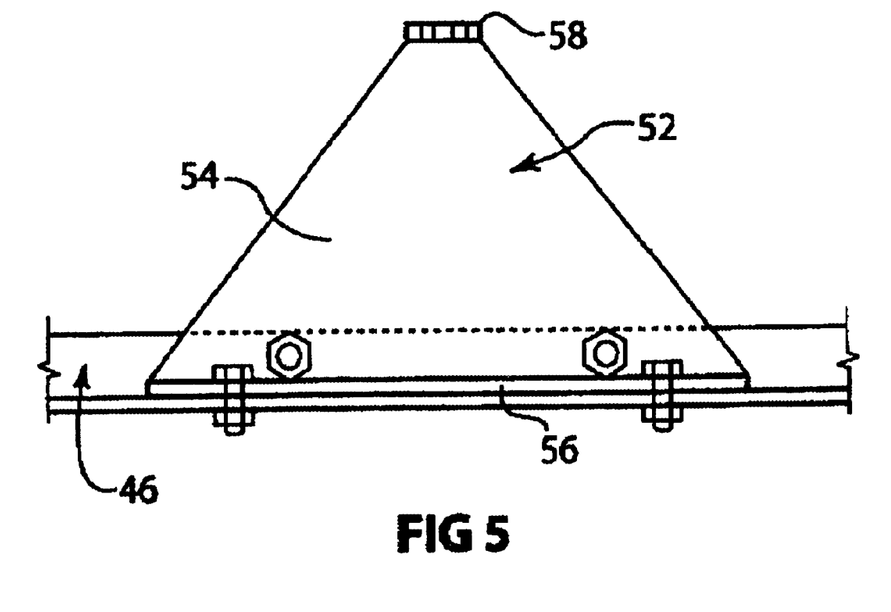
FIG. 5 is a front elevation of the mounting bracket illustrated in FIG. 4.
Figure 6:
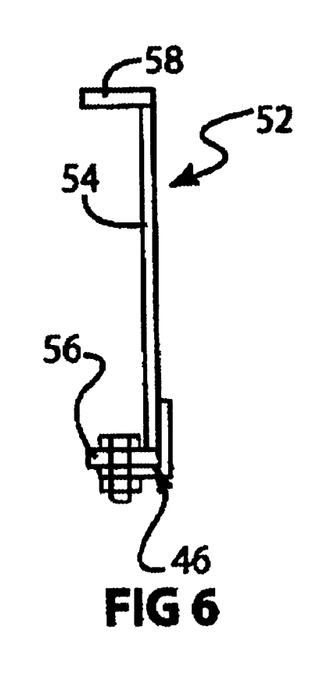
FIG. 6 is a side elevation of the mounting bracket illustrated in FIG. 4.
Figure 7:
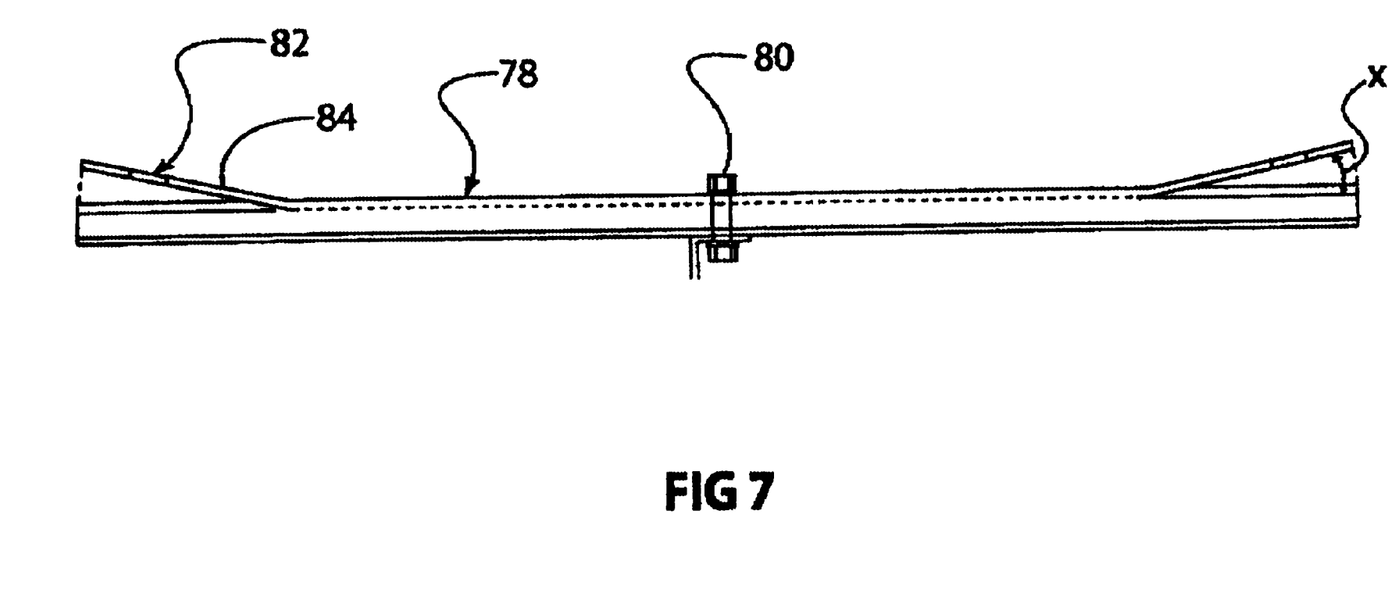
FIG. 7 is a side elevation, with parts in section, of the floor brace utilized to mount the shock absorbing and dampening devices utilized in one embodiment of the present invention.

Referring now to FIGS. 2 and 3, the rear portion 14 typically includes a driver's seat 34, a passenger seat 36, vehicle operating controls 38, and a pair of closets 40, 42 for storing clothing, equipment and the like. The rear portion 16 includes the access 26 as previously illustrated. A bed assembly 44 is disposed within the rear portion 16 as discussed in greater detail below. Typically, a metal frame or lip 46 extends around the interior surface of the walls 18, 20, 22 and 24 approximately 20 inches above the floor surface 32. A bed frame 48 is disposed above the floor 32 and inward of the walls 18, 20, 22 and 24 and the frame 46 as discussed below.

In preferred form, a plurality of attachment members 50 in the form of brackets 52 are secured to the metal frame 46 along the walls 18, 20, 22 and 24. Preferably, there are two such brackets 52 disposed along the rear wall 18 and the front wall 24, while there is only one such bracket 52 disposed along each side wall 20, 22. Each bracket 52 preferably includes a triangular-shaped plate 54 for strength which is secured by a bottom shoulder 56 to the metal frame 46. At the upper end of the plate 54 is an attachment ear 58 having a pair of apertures 60.

At least one tension element 62 is secured to each ear 58 by way of the apertures 60. In preferred form, the tension element 62 is in the form of a coiled perimeter spring having one end attached to the ear 58 and its other end attached to an eye-bolt 64 which in turn is firmly affixed to the bed frame 48. It should be understood, however, that any type of appropriate tension member may be utilized. Furthermore, each coiled spring 62 is preferably substantially in the same horizontal plane as that of the bed frame 48 and is angularly aligned between the frame 48 and the brackets 52 relative to the longitudinal or transverse axis of the frame 48. As can be seen in FIG. 3, brackets 52 on the side walls 18, 20 each include a pair of coiled springs 62, while the remaining brackets 52 on the front and rear walls 24, 18, respectively, each include only one coiled spring 62. The angular orientation of the coiled spring 62 between the brackets 52 and the frame 48 assist in maintaining the bed frame 48 free floating in the approximate center of the rear portion 16 without bouncing against the side walls 20, 22 or the front and rear walls 24, 18 during movement of the vehicle. These orientations also decrease the fore-and-aft and lateral motions of the frame 48 relative to be walls 18, 20, 22 and 24 and the floor 32. Finally, the angular orientation of the springs 62 complement the shock absorbing and dampening devices discussed below.

The bed frame 48 is preferably in the form of a generally rectangular structure having a pair of elongated L-shaped sides 66, 68 which extend transversely to the length of the vehicle 10, and a pair of L-shaped end members 70, 72 secured to the ends of the sides 66, 68. One or more cross braces 74 may be used to secure the sides 66, 68 together at the midsections thereof. Thus, the brackets 52 and the springs 62 hold the frame 48 in the center of the rear cab portion 16, and the bed frame 48 with its L-shaped sections is sized and shaped to hold a piece of plywood 75 or the like therein onto which a mattress 30 may be placed.

Referring now more particularly to FIGS. 3 and 7–9, a plurality of, and preferably four, adjustable shock absorbing and dampening devices 76 are utilized to provide vertical support to the frame 48 as well as to provide fore-and aft, lateral and vertical dampening for the frame 48 and mattress 30 relative to the walls 18, 20, 22 and 24 and floor 32. More specifically, a pair of floor braces 78 are secured to the floor 32 by a bolt assembly 80 or the like. Each brace 78 includes end portions 82 which are preferably in the form of an upwardly ramped end element 84. The end element 84 is preferably angled upwardly relative to the floor 32 at an angle "X" of between 10°–15°, and most preferably 12°. The dampening device 76 is preferably fixed at its lowermost end 86 to the ramped element 84. In preferred form, the end portion 86 includes a first piston end 88 secured by a nut 90 and a dampening rubber bushing 92 to the ramped element 84. Consequently, the end portion 86 is angled relative to the floor 32 based on the angle "X" of the ramped element 84. This in turn affects and determines the angle "Y" with which the uppermost end 94 of the dampening device 76 is attached to the frame 48.

Figure 8:
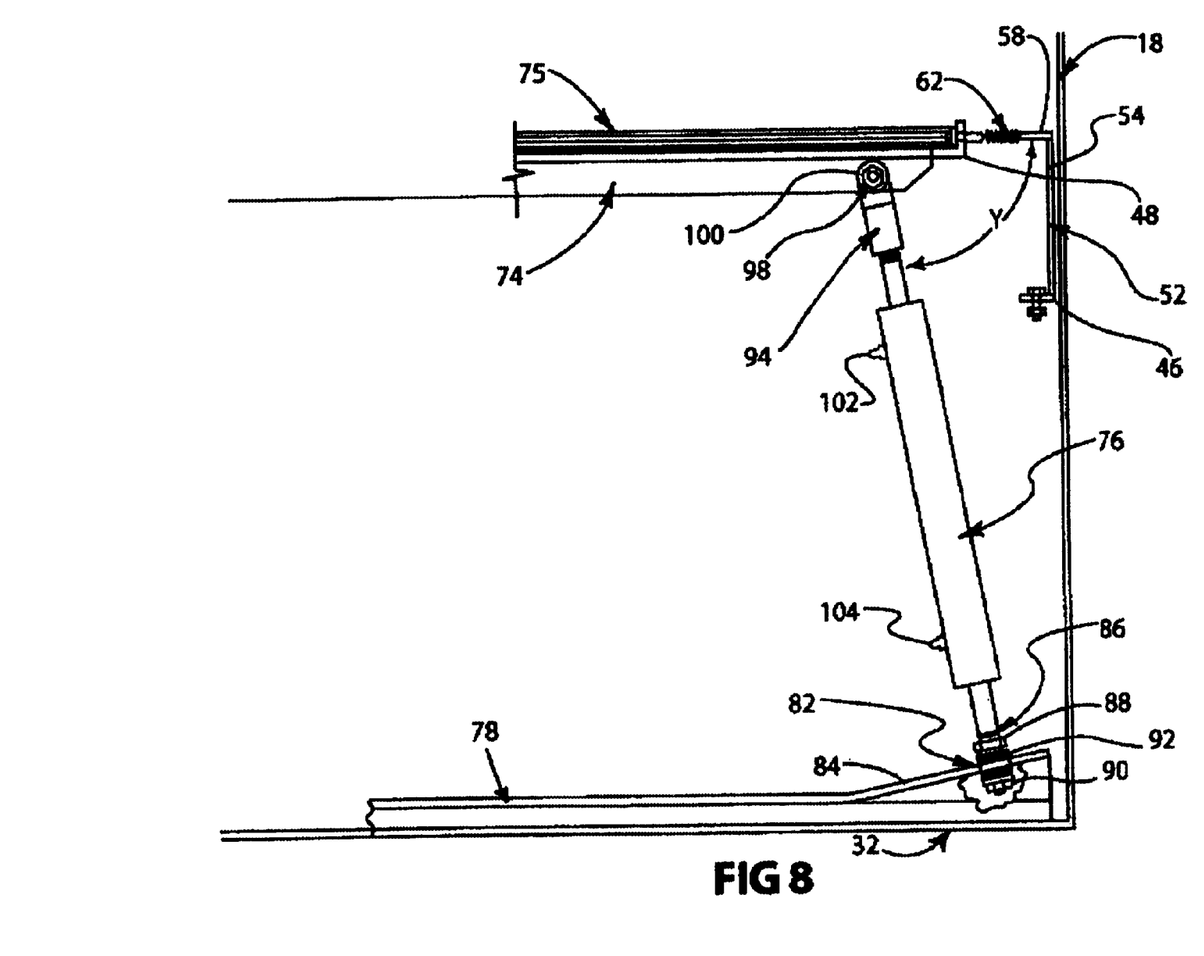
FIG. 8 is an enlarged, partial side elevation illustrating the brace of FIG. 7 with a shock absorbing and dampening device mounted thereto.

The uppermost end portion 94 of the device 76 is in the form of a second piston end 96 which is preferably secured to the frame 48 by a nut and bolt attachment member 98 and ball bearing 100. The bearing element 100 provides lateral flex between its outer race and the bolt/nut combination 98 and therefore provides for variable movement at the bolt connection 98 between the frame 48 and the upper portion 94. This in turn reduces the stress and shear forces at this connection point due to movement of the frame relative to the walls 18, 20, 22 and 24 and the floor 32. In preferred form, each brace 74 is in the form of an inverted U-channel so that the bearing 100 may be positioned therein and secured by the bolt assembly 98.

As indicated above, the angle "X" at the lowermost connection of the device 76 is preferably 10°–15°, and this in turn creates and maintains an angle "Y" of approximately 80°–75° at the uppermost connection of the device 76. This inward angle of the uppermost end 94 relative to the lowermost end portion 86 of the device 76 assists in dampening the fore-and-aft, lateral and vertical movement of the bed frame 48 in cooperation with the coil springs 62. If the angle "X" is much greater than 15°, then the dampening devices 76 will loose a significant portion of their vertical support of the frame 48. On the other hand, if the angle "X" is much less than 10°, all the weight of the frame 48 with its component elements including a piece of plywood 75 and the mattress 30 will be centered in the middle of the frame 48. This will tend to create a bow in the center with commensurate outboard pressure against the uppermost connection 94 of the devices 76. This will create greater wear and tear with less shock value, and it will also lessen the lateral dampening effect of the devices 76.

Figure 9:
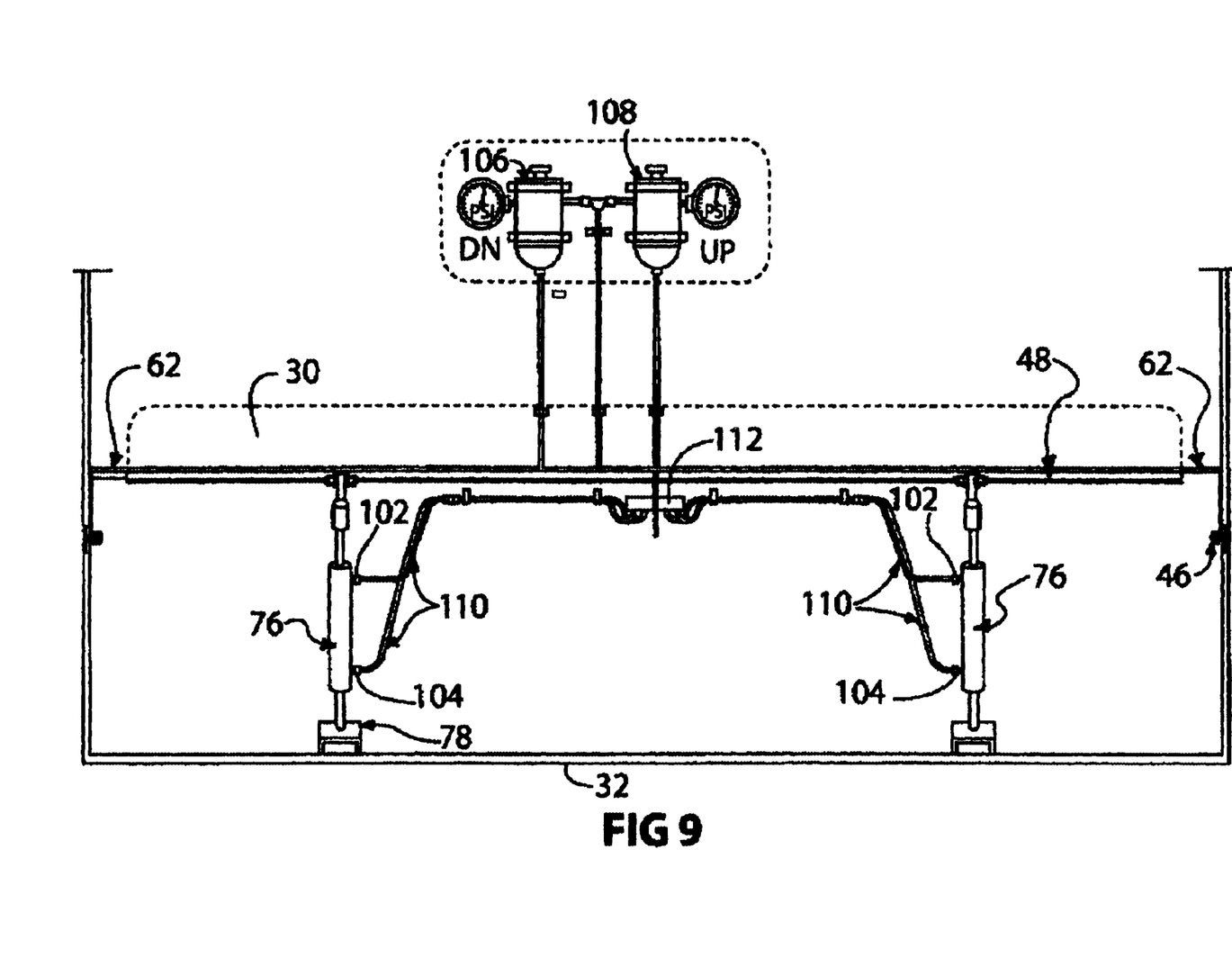
FIG. 9 is a rear perspective view of the bed assembly of the present invention and illustrating a preferred control system therefor.

Each shock absorbing and dampening device 76 includes an internal piston and is fluid controlled and adjustable. In the preferred form the fluid used is compressed air, although hydraulic fluid or any other type of fluid known to the art may be used. Each device 76 includes two fluid ports 102 and 104 which are in turn attached to two regulators 106, 108 by way of fluid lines 110. Typically, the regulators 106, 108 may be disposed within one of the cab closets 40, 42. The regulator 108 controls the air flow to the lower inlet port 104 to move the lower end 86 downwardly and the upper end 94 upwardly to adjust the amount of lift the devices 76 provide. This adjustment permits an operator to adjust the lift depending on the weight of the person utilizing the bed assembly. Obviously, the heavier the person, the greater the amount of desired lift to maintain the frame 48 and mattress 30 approximately level with the brackets 52. Moreover, the regulator 106 controls the air flow to the upper ports 102 of the devices 76 to provide an adjustable dampening effect, again depending upon the weight of the person on the bed assembly as well as the type of road terrain being covered by the vehicle 10. An air manifold 112 dispenses and bleeds the air through the lines 110 to the four devices 76 as desired. Moreover, a compressed air source is needed to feed the regulators 106, 108, and this is preferably from an auxiliary air compressor (not illustrated) which is typically standard in most over-the-road trucks. Compressed air from a vehicle's air brake system should preferably not be used.

As can be seen from the above, a unique bed assembly is provided by the present invention wherein the suspension system therefor provides significant dampening against not only vertical bed movement, but also fore-and-aft as well as lateral movement. Moreover, the system of the invention enables a vehicle operator to adjust the bed assembly dampening effects based on the weight of the person using the bed as well as the type of road or driving conditions the driver is encountering. The invention may be incorporated into any moving vehicle as either original equipment or as an after market retrofit utilizing the basic bed frame already incorporated into the original vehicle. Moreover, the present invention may be manufactured and marketed as a suspension kit for installation by vehicle owners.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

I claim:

1. A bed assembly for use within a moving vehicle which vehicle includes a base support floor and a plurality of side wall members, said bed assembly comprising:
   a frame adapted to support a mattress and having a generally rectangular perimeter,
   attachment members secured to the vehicle and spaced about at least a portion of the perimeter of said frame;
   a plurality of tension elements interconnecting said frame and said attachment members;
   a plurality of adjustable shock absorbing and dampening devices interconnecting said frame and the vehicle base support floor to provide vertical support and attachment to said frame from below, with each said shock absorbing and dampening device being aligned angularly from said base support floor relative to said frame to cooperate with said tension elements to dampen the fore-and-aft, lateral and vertical motion of said frame relative to said vehicle base support floor and side wall members during movement of the vehicle, each said shock absorbing and dampening device being fluid controlled to selectively move the ends of the device in each of two opposite directions to provide both selectively variable dampening effect as well as selectively variable lift to said frame from said base support floor depending on the weight carried on said frame; and
   a controller element for selectively and variably adjusting the fluid pressure directed to each said shock absorbing and dampening device for independently moving the ends of each said device in each of two opposite directions to provide, respectively, the adjustably variable dampening effect and the selectively variable lift to said frame.

2. The bed assembly as claimed in claim 1, wherein said attachment members comprise a plurality of mounting brackets.

3. The bed assembly as claimed in claim 2, wherein said mounting brackets are disposed along the side wall members of said vehicle spaced from said frame perimeter.

4. The bed assembly as claimed in claim 3, wherein said tension elements comprise a plurality of spring members interconnecting said brackets and said frame and horizontally angularly aligned relative to said frame.

5. The bed assembly as claimed in claim 1, wherein said tension elements comprise a plurality of coil spring members disposed under tension and interconnecting said brackets and said frame at an angle relative to said frame.

6. The bed assembly as claimed in claim 1, wherein said shock absorbing and dampening devices are fluid controlled and adjustable.

7. The bed assembly as claimed in claim 6, wherein the fluid controlling said shock absorbing and dampening devices is air.

8. The bed assembly as claimed in claim 7, wherein each said shock absorbing and dampening device includes a central piston and air control means attached to opposite ends thereof, and wherein said controller element comprises an air compressor and air regulator members adapted to direct air independently to each end of said shock absorbing and dampening devices.

9. The bed assembly as claimed in claim 1, wherein each said shock absorbing and dampening device includes an upper and a lower end portion, wherein the lower end portion of each said device is firmly secured to the base support floor utilizing a shock absorptive bushing, and the upper end portion of each said device is connected to said frame utilizing a bearing member to permit variable movement between said frame and said upper end portion to reduce the stress and shear at the connection therebetween.

10. The bed assembly as claimed in claim 1, wherein each said shock absorbing and dampening device is aligned at an acute angle relative to the horizontal plane of said frame and the vertical plane of said wall members.

11. The bed assembly as claimed in claim 10, wherein said assembly further includes a pair of floor braces aligned transversely to the longitudinal axis of said generally rectangular frame, and wherein said shock absorbing and dampening devices are secured to the ends of said braces at an angle of approximately 10°–15° relative to the horizontal plane of said base support floor to create an acute angle of approximately 80°–75° between said shock absorbing and dampening devices and said frame.

12. A suspension system attachable to a vehicle sleeper cab for reducing the fore-and-aft, lateral and vertical movement of a bed frame mounted therein resulting from movement of the vehicle, the sleeper cab including a floor for supporting the bed frame and a plurality of substantially vertical side walls substantially surrounding the bed frame, said system comprising:

attachment members secured to the side walls of the sleeper cab and spaced about at least a portion of the perimeter of the bed frame;

a plurality of spring elements securing said attachment members to said frame along its perimeter, a plurality of fluid adjustable dampening devices vertically supporting said frame above the sleeper cab floor, said dampening devices being aligned angularly from said sleeper cab floor relative to said frame to cooperate with said spring elements to dampen the fore-and-aft, lateral and vertical motion of said frame relative to said sleeper cab floor and side walls during movement of the vehicle sleeper cab, each said dampening device being fluid controlled to selectively move the ends of the device in each of two opposite directions to provide both selectively variable dampening effect as well as selectively variable lift to said frame from said sleeper cab floor depending on the weight carried on said frame; and a controller element for selectively and variably adjusting the fluid pressure directed to each said fluid adjustable dampening device for independently moving the ends of each said device in each of two opposite directions to provide, respectively, the adjustably variable dampening effect and the selectively variable lift to said frame.

13. The apparatus as claimed in claim 12, wherein said attachment members comprise a plurality of mounting brackets spaced from the perimeter of said frame.

14. The apparatus as claimed in claim 13, wherein said spring elements interconnect said brackets to said frame and are horizontally angularly aligned relative to said frame.

15. The apparatus as claimed in claim 12, wherein the fluid controlling said dampening devices is air.

16. The apparatus as claimed in claim 15, wherein each said dampening device includes a central piston and air control means attached to opposite ends thereof, and wherein said controller element comprises an air compressor and air regulator members adapted to direct air independently to each end of each said dampening device.

17. The apparatus as claimed in claim 16, wherein each said dampening device includes an upper and a lower end portion, wherein the lower end portion of each said dampening device is firmly secured to the sleeper cab floor utilizing a shock absorptive bushing, and the upper end portion of each said dampening device is connected to said frame utilizing a ball bearing member to permit variable movement between said frame and said upper end portion to reduce the stress and shear at the connection therebetween.

18. The apparatus as claimed in claim 12, wherein said system further includes a pair of floor braces aligned transversely to the longitudinal axis of said frame, and wherein said dampening devices are secured to the ends of said braces at an angle of approximately 10°–15° relative to the horizontal plane of said sleeper cab floor to create an acute angle of approximately 80°–75° between said dampening devices and said frame.

19. A truck sleeper cab comprising:

a cab housing having a front portion and a rear portion, said front portion including a driver seat, a passenger seat and truck operating controls, and said rear portion including a base floor, a rear wall, a pair of side walls, a front wall and an access opening through said front wall to permit movement between said front and rear cab portions;

a bed frame having a generally rectangular perimeter disposed in said rear cab portion and adapted to support a mattress, said bed frame being spaced above said base floor;

attachment members secured to the rear wall, side walls and front wall of said rear cab portion and spaced about the perimeter of said bed frame;

a plurality of tension elements interconnecting said bed frame and said attachment members;

a plurality of adjustable shock absorbing and dampening devices interconnecting said bed frame to said base floor to provide vertical support and attachment to said bed frame from therebelow, each said shock absorbing and dampening device being aligned angularly from said base floor relative to said bed frame to cooperate with said tension elements to dampen the fore-and-aft, lateral and vertical motion of said bed frame relative to said rear portion base floor, rear wall, side walls and front wall during movement of the truck sleeper cab, and each said shock absorbing and dampening device further being fluid controlled to selectively move the ends of the device in each of two opposite directions to provide both selectively variable dampening effect as well as selectively variable lift to said frame from said base floor depending on the weight carried on said frame; and a controller element for selectively and variably adjusting the fluid pressure directed to each said shock absorbing and dampening device for independently moving the ends of each said device in each of two opposite directions to provide, respectively, the adjustably variable dampening effect and the selectively variable lift to said frame.

20. The truck as claimed in claim 19, wherein said attachment members comprise a plurality of mounting brackets, and wherein said tension elements comprise a plurality of coil spring members interconnecting said brackets to said bed frame and being horizontally angularly aligned relative to said frame to assist in maintaining said bed frame centrally disposed within said rear cab portion.

21. The truck as claimed in claim 19, wherein said shock absorbing and dampening devices are air adjustable and controllable.

22. The truck as claimed in claim 21, wherein each said shock absorbing and dampening device includes a central piston and air control means attached to opposite ends thereof, and wherein said controller element comprises an air compressor and air regulator members adapted to direct air independently to each end of each said shock absorbing and dampening device.

23. The truck as claimed in claim 22, wherein each said shock absorbing and dampening device includes an upper and a lower end portion, wherein the lower end portion of each said device is firmly secured to said base floor utilizing a shock absorptive bushing, and the upper end portion of each said device is connected to said bed frame utilizing a bearing member to permit variable movement between said frame and said upper end portion to reduce the stress and shear at the connection therebetween.

24. The truck as claimed in claim 19, wherein each said shock absorbing and dampening device is aligned at an acute angle relative to the horizontal plane of said bed frame and the vertical plane of said rear and front wall members.

25. The truck as claimed in claim 24, wherein said sleeper cab further includes a pair of floor braces disposed on said base floor and aligned transversely to the longitudinal axis of said generally rectangular bed frame, and wherein said shock absorbing and dampening devices are secured to the ends of said braces at an angle of approximately 10°–15° relative to the horizontal plane of said base floor to create an acute angle of approximately 80°–75° between said shock absorbing and dampening devices and said bed frame.

* * * * *